(12) United States Patent
Hikima et al.

(10) Patent No.: US 12,056,634 B2
(45) Date of Patent: Aug. 6, 2024

(54) CALCULATION METHOD, CALCULATION APPARATUS AND PROGRAM

(71) Applicant: NIPPON TELEGRAPH AND TELEPHONE CORPORATION, Tokyo (JP)

(72) Inventors: Yuya Hikima, Tokyo (JP); Masahiro Kojima, Tokyo (JP); Yasunori Akagi, Tokyo (JP); Tatsushi Matsubayashi, Tokyo (JP); Takeshi Kurashima, Tokyo (JP); Hiroyuki Toda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 14 days.

(21) Appl. No.: 17/777,609

(22) PCT Filed: Nov. 19, 2019

(86) PCT No.: PCT/JP2019/045220
§ 371 (c)(1),
(2) Date: May 17, 2022

(87) PCT Pub. No.: WO2021/100108
PCT Pub. Date: May 27, 2021

(65) Prior Publication Data
US 2022/0414554 A1    Dec. 29, 2022

(51) Int. Cl.
*G06Q 10/04*    (2023.01)
*G06Q 30/0283*    (2023.01)
*G08G 1/00*    (2006.01)

(52) U.S. Cl.
CPC ......... *G06Q 10/04* (2013.01); *G06Q 30/0284* (2013.01); *G08G 1/202* (2013.01)

(58) Field of Classification Search
CPC ..... G06Q 10/04; G06Q 30/0284; G08G 1/202
USPC ......................................................... 705/417
See application file for complete search history.

(56) References Cited

U.S. PATENT DOCUMENTS

| | | | |
|---|---|---|---|
| 10,026,506 B1* | 7/2018 | LaBorde | G06K 7/10366 |
| 2014/0214459 A1* | 7/2014 | Ryder | B60L 53/63 |
| | | | 705/5 |
| 2017/0364968 A1* | 12/2017 | Gopalakrishnan | |
| | | | G06Q 30/0283 |
| 2018/0101877 A1* | 4/2018 | Song | G01C 21/3492 |

(Continued)

OTHER PUBLICATIONS

"Taxi Dispatch System Based on Current Demands and Real-Time Traffic Conditions" Published by Transportation research record (Year: 2004).*

(Continued)

*Primary Examiner* — Zeina Elchanti

(57) ABSTRACT

The present disclosure enables vehicle dispatch in consideration of individual differences of each orderer for a price and a required time by a computer executing an input procedure to input parameters for a distance matrix relating to a distance between a taxi and an orderer giving a taxi dispatch order, a travel distance for an order, an opportunity cost parameter for a taxi driver, and an acceptance probability function of the orderer, and a calculation procedure to calculate a price and a required time to be presented to the orderer by solving an optimization problem formulated using the parameters.

20 Claims, 5 Drawing Sheets

(56) References Cited

U.S. PATENT DOCUMENTS

2018/0364062 A1* 12/2018 Wang ............. G06Q 10/063114
2019/0236742 A1*  8/2019 Tomskii ............. G06Q 30/0611
2019/0244318 A1*  8/2019 Rajcok ................. H04W 4/029
2022/0284792 A1*  9/2022 Gerrese .................. H04W 4/48

OTHER PUBLICATIONS

Garg et al. (2018) "Route Recommendations for Idle Taxi Drivers: Find Me the Shortest Route to a Customer!" KDD, Aug. 19, 2018, London, United Kingdom.
Tong et al. (2018) "Dynamic Pricing in Spatial Crowdsourcing: A Matching-Based Approach" SIGMOD Conference, Jun. 10, 2018, Houston, Texas, U.S.
Ikeda et al. (2014) "Mobility on Demand for Improving Business Profits and User Satisfaction" Fujitsu, vol. 65, No. 4.

\* cited by examiner

CALCULATION METHOD, CALCULATION APPARATUS AND PROGRAM

CROSS-REFERENCE TO RELATED APPLICATIONS

This application is a U.S. National Stage Application filed under 35 U.S.C. § 371 claiming priority to International Patent Application No. PCT/JP2019/045220, filed on 19 Nov. 2019, the disclosure of which is hereby incorporated herein by reference in its entirety.

TECHNICAL FIELD

The present invention relates to a calculation method, a calculation apparatus, and a program.

BACKGROUND ART

In recent years, in the mobile service by taxi, IT has been promoted such that vehicle dispatch applications become widespread, and so on. As a result, people's movement history can be obtained, so that a price setting of a mobile service is made for each region, and prediction of mobile demand and the like are made.

There are many researches on techniques involved in the vehicle dispatch techniques and price determination techniques to maximize the profits of taxi. Examples include a price determination technique in accordance with the mobile demand in each region (NPL 2), minimization of the travel distance of taxi in an idle state (NPL 1), and the like.

In order to make a simultaneous determination of a price and time taking into account the probability of acceptance of an individual, it is necessary to solve a two-step optimization problem including uncertainties. Solutions to such an optimization problem include the L-shaped method, a technique combining an implicit enumeration method and the L-shaped method, and the like.

CITATION LIST

Non Patent Literature

NPL 1: Nandani Garg and Sayan Ranu. Route recommendations for idle taxi drivers: Find me the shortest route to a customer! In Proceedings of the 24th ACM SIGKDD International Conference on Knowledge Discovery & #38, Data Mining, KDD '18, pp. 1425{1434, New York, NY, USA, 2018.ACM.

NPL 2: Yongxin Tong, Libin Wang, Zimu Zhou, Lei Chen, Bowen Du, and Jieping Ye. Dynamic pricing in spatial crowdsourcing: A matching-based approach. In SIGMOD Conference, 2018.

SUMMARY OF THE INVENTION

Technical Problem

However, vehicle dispatch has not yet been carried out in consideration of the characteristics of each orderer. For example, nearby taxis are preferentially dispatched for busy people, and distant taxis are cheaply dispatched for less busy people, and so on. In order to carry out such a vehicle dispatch method, it is necessary to model and consider the acceptance or rejection of orderers according to the taxi price and the required time of each orderer when formulating the vehicle dispatch plan.

The present invention has been made in view of the circumstances described above, and an object of the present invention is to enable vehicle dispatch in consideration of individual differences of each orderer for the price and the required time.

Means for Solving the Problem

In order to solve the above problem, a computer executes: an input procedure to input parameters for a distance matrix relating to a distance between a taxi and an orderer giving a taxi dispatch order, a travel distance for an order, an opportunity cost parameter for a taxi driver, and an acceptance probability function of the orderer; and a calculation procedure to calculate a price and a required time to be presented to the orderer by solving an optimization problem formulated using the parameters.

Effects of the Invention

The present invention enables vehicle dispatch in consideration of individual differences of each orderer for the price and the required time.

DESCRIPTION OF EMBODIMENTS

Figure 1:
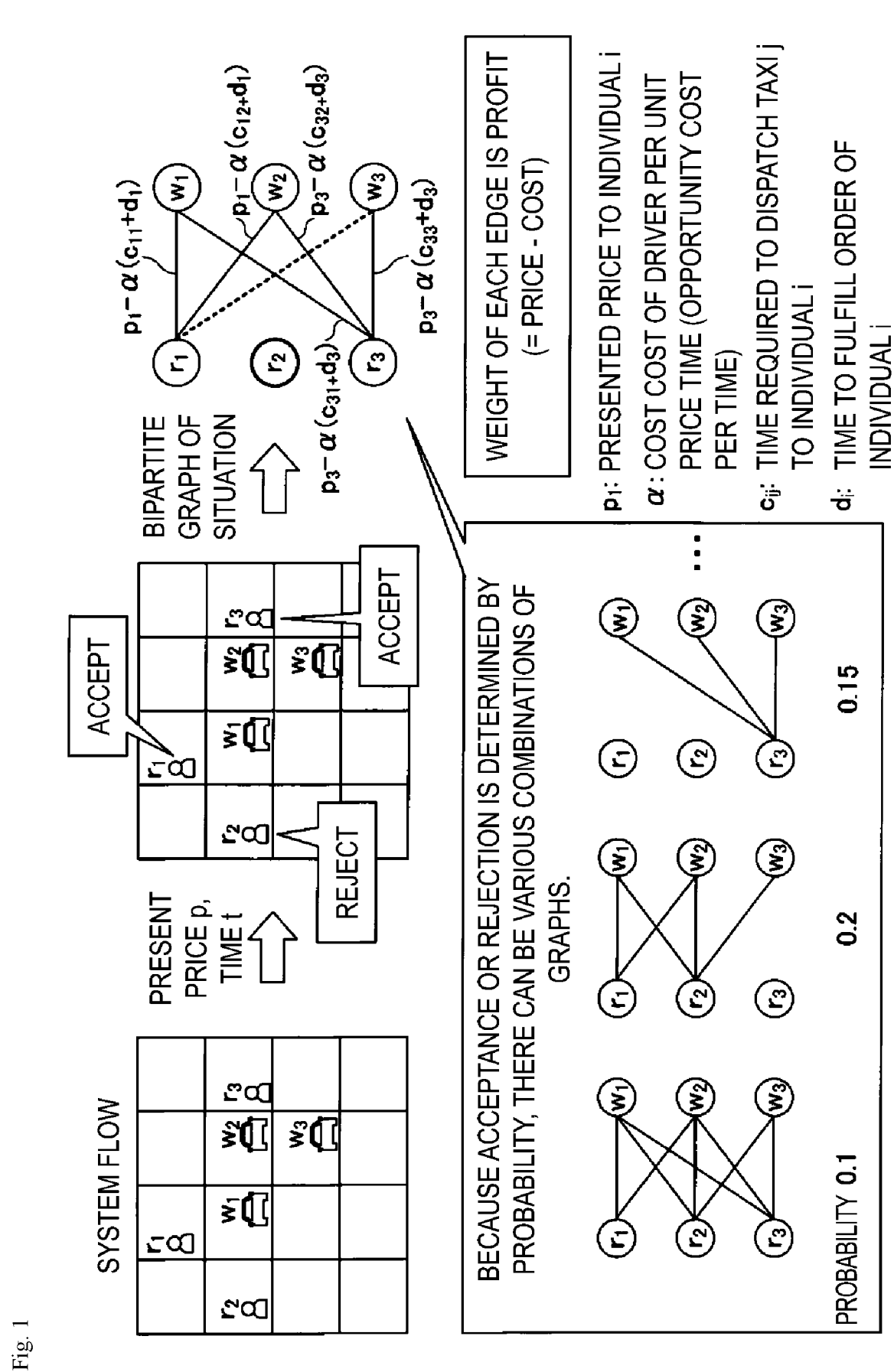
FIG. 1 is a diagram illustrating an example of a system assumed in an embodiment of the present invention.

Existing techniques have not been able to take account of the taxi acceptance probability of individuals for the price and the required time. For example, the problem formulated in NPL 2 can be written as follows.

First, suppose that orderers of vehicle dispatch of taxis $r_i$ (i=1, 2, . . . , n) and drivers of taxis $w_j$ (j=1, 2, . . . , m) are present in the space. Each driver can only dispatch to an orderer within a radius $a_w$ from its position, and E is a set of combinations of orderers and drivers that can be dispatched. It is assumed that each orderer i has a distance $d_i$ from the getting-in place of the order to the getting-off place. It is also assumed that the space is divided into grids g=1, 2, . . . , 1, and the orderers present in each grid g accept the proposal with a probability of $S_g(p_g)$ and reject the proposal with a probability of $1-S_g(p_g)$ for the price $p_g$ per unit of taxi distance presented to each. The acceptance probability determines acceptance or rejection, and by using the result, it is possible to construct a bipartite graph regarding the orderers and the drivers that can be matched. If $a \in \{0, 1\}^n$ represents the acceptance result of each orderer, $a_i=1$ represents acceptance and $a_i=0$ represents rejection for each orderer i. For each acceptance result a, a matching problem between taxis and orderers to maximize the corporate profits can be written as follows.

[Math. 1]

$$\max_z \sum_{i,j} p_{g_i} d_i a_i z_{ij}$$

$$\text{s.t.} \sum_j z_{ij} \leq 1 \quad (i = 1, 2, \ldots, n)$$

$$\sum_i z_{ij} \leq 1 \quad (j = 1, 2, \ldots, m)$$

$$z_{ij} \in \{0, 1\} \quad (\forall (i, j) \in E)$$

where, $g_i$ is a subscript representing the grid in which the orderer i exists. $z_{ij}$ represents the matching of the orderer i and the taxi j, and if $z_{ij}=1$, the taxi j is dispatched to the orderer i. $p_{g_i} d_i$ in the objective function represents the profit when matching is established. If $z_{ij}=1$ and $a_i=1$, matching is established, resulting in the profit of $p_{g_i} d_i$. However, if $z_{ij}=0$ or $a_i=0$, matching is not established, so the profit is 0. The first constraint is to limit the number of taxis that can be dispatched to an orderer to one, and the second constraint is to limit the number of orderers undertaken by a taxi to one. The fourth constraint is a constraint that only taxis that can be dispatched within the time presented to the orderer can be dispatched to the orderer.

Thus, the problem of maximizing the expected value of the profit obtained by presenting the price vector p of all grids to the customer can be written as follows when the optimal value of the above problem is h (a, p).

[Math. 2]

$$\max_p E[h(a, p) \mid p] = \sum_{a \in \{0,1\}^n} Pr(a \mid p) h(a, p) \quad (1)$$

where

[Math. 3]

$$Pr(a \mid p, t) := \prod_{i=1,2,\ldots,n} \{S_{g_i}(p_{g_i})^{a_i} (1 - S_{g_i}(p_{g_i}))^{(1-a_i)}\}.$$

However, in this approach, the acceptance probability for the price is defined for each region, and the difference in the acceptance probability of each orderer is not taken into consideration. Changes in the acceptance probability according to the required time is also not captured. Thus, in the present embodiment, the optimization problem is formulated in consideration of the acceptance probability of individuals for the price and the required time.

However, the problem formulated according to the present embodiment is difficult to solve with conventional techniques. Conventional techniques such as the L-shaped method, which is a conventional technique for optimization problems including uncertainties, and a technique combining an implicit enumeration method and the L-shaped method cannot be applied to the problem of the present embodiment, and the optimization problem including the probability model with time and price as elements as described above is very difficult to solve with the following two points.

Because $2^n$ of bipartite graph matching is included in the objective function, the calculation of the derivative value and the objective function value cannot be performed in polynomial time.

The objective function is discontinuous with respect to t.

It is possible to obtain a local optimal solution by using a gradient method or the like by solving the second-stage problem for all cases caused by the probability, but it requires a huge amount of calculation time. Thus, in the present embodiment, an approximate solution (approximate algorithm) with a small amount of calculation that takes advantage of the unique characteristics of the problem is proposed for the formulated problem.

Formulation of Optimization Problem Including Acceptance Probability Model of Orderer for Price and Time The problem of the present embodiment is formulated. First, as a premise, each orderer i has an acceptance probability $S_i$ (p, t) for a case where a taxi of a price p and a required time t (the time from ordering to the arrival of the taxi at the getting-in place+the time to fulfill the order of the orderer (i.e., travel time to the getting-off place)) is presented. The orderer determines whether to take a taxi according to this acceptance probability. Examples of such an acceptance probability model include a discrete choice model using a generalized cost function. Additionally, various probability models can be utilized, such as logistic regression models and deep learning models. The acceptance probability model also includes acceptance probability models according to each region of conventional techniques, so it can be adopted.

A case where a discrete choice model using a generalized cost function is used as an acceptance probability model will be described. First, the generalized cost is the total cost of travel converted into monetary value. For example, the generalized cost $C_{ik}$ when the individual i selects the means of transportation k can be defined as follows using the price $p_k$ of the means of transportation k, the time $t_k$ required for the traveling, and the time value $W_i$, which is the monetary value per unit time.

$$C_{ik} = p_k + W_i t_k$$

At this time, the probability that the orderer i selects the means of transportation k' can be defined as follows using a generalized cost function, where K is the set of options for the means of transportation.

$$P_{ik'} = Pr(C_{ik'} + \varepsilon_{k'} < C_{ik} + \varepsilon_k | \forall k \in K/\{k'\})$$

where, ε is a random variable representing an error, and represents the influence of other factors that cannot be grasped by the monetary cost and the time cost or the influence of the estimation error of the time value W. Assuming that each E is independent of each other and follows a Gumbel distribution having the same distribution, the probability that the individual i selects the option k' is derived as follows.

[Math. 4]

$$P_{ik'} = \frac{\exp(-C_{ik'})}{\sum_{k \in K} \exp(-C_{ik})} = \frac{\exp(-p_{k'} - W_i t_{k'})}{\sum_{k \in K} \exp(-p_k - W_i t_k)}$$

Thus, the probability that the individual i selects a taxi with a price p and a required time t is derived as follows.

[Math. 5]

$$S_i(p, t) = \frac{\exp(p + W_i t)}{\exp(p + W_i t) + \sum_{k \in K} \exp(p_k + W_i t_k)}$$

where, K represents a set of options for the means of transportation other than taxis. Here, because public transportation (trains, buses, etc.) has published prices and required times, the prices and required times of other means of transportation, $p_k$, $t_k$, can be input from external information. The time value parameter $W_i$ of each orderer i can be estimated from acceptance history data of taxis or the like, so it is possible to set the acceptance probability model.

The problem is formulated using the above assumptions. Suppose that orderers $r_i$ (i=1, 2, ..., n) and drivers $w_j$ (j=1, 2, ..., m) are present in the space as illustrated on the left side of FIG. 1. At this time, if the price $p_i$ and the required time $t_i$ are presented to each orderer i, suppose that each orderer i accepts the proposal with a probability of $S_i$ ($p_i$, $t_i$), and rejects the proposal with a probability of 1-$S_i$ ($p_i$, $t_i$).

In this way, the acceptance probability determines acceptance or rejection, and as a result, it is possible to construct a bipartite graph regarding the orderers and the drivers that can be matched. The right side of FIG. 1 is a bipartite graph illustrating the orderers and the drivers that can be matched when the price and the required time are presented in the state on the left side. In this example, the orderer $r_2$ rejects the proposal, so there is no edge connecting to the node of $r_2$. Because the driver $w_3$ cannot fulfill the order within the presented time for the orderer r 1, there is no edge connecting $r_1$ and $w_3$.

Here, $a \in \{0, 1\}^n$ represents the acceptance result of each orderer. $a_i$=1 represents acceptance and $a_i$=0 represents rejection for each orderer i. When the price p and the time t are presented to n orderers and the result of acceptance or rejection is represented by a, the matching problem between taxis and orderers to maximize the corporate profits can be written as follows.

[Math. 6]

$$\max_z \sum_{i,j} (p_i - \alpha(c_{ij} + d_i))a_i z_{ij} \quad (2)$$

$$\text{s.t.} \sum_j z_{ij} \leq 1 \quad (i = 1, 2, \ldots, n)$$

$$\sum_i z_{ij} \leq 1 \quad (j = 1, 2, \ldots, m)$$

$$z_{ij} = 0 \quad (t_i < c_{ij} + d_i)$$

$$z_{ij} \in \{0, 1\} \quad (\forall (i, j))$$

$z_{ij}$ represents the matching of the orderer i and the taxi j, and if $z_{ij}$=1, the taxi j is dispatched to the orderer i. $\alpha$ represents the opportunity cost per unit time of the taxi driver, $c_{ij}$ represents the time required for the taxi j to arrive at the departure place of the orderer i, and $d_i$ represents the time from the departure place (getting-in place) of the orderer i to the destination place (getting-off place), and ($p_i - \alpha(c_{ij} + d_i)$) in the objective function represents the profit when matching is established. If $z_{ij}$=1 and $a_i$=1, matching is established, resulting in the profit of ($p_i - \alpha(c_{ij} + d_i)$). However, if $z_{ij}$=0 or $a_i$=0, matching is not established, so the profit is 0.

The first constraint is to limit the number of taxis that can be dispatched to an orderer to one, and the second constraint is to limit the number of orderers undertaken by a taxi to one. The fourth constraint is a constraint that only taxis that can fulfill the order within the time presented to the orderer can be dispatched to the orderer. When the optimal value of the problem (2) is f (a, p, t), the expected value of the profit obtained by presenting p, t to the customer is

[Math. 7]

$$\max_{p,t} E[f(a, p, t) | p, t] = \sum_{a \in \{0,1\}^n} Pr(a | p, t) f(a, p, t). \quad (3)$$

Here,

[Math. 8]

$$Pr(a | p, t) := \prod_{i=1,2,\ldots,n} \{S_i(p_i, t_i)^{a_i}(1 - S_i(p_i, t_i))^{(1-a_i)}\}.$$

Thus, it is sufficient to find p, t to maximize this, but there are also the following constraints for p, t.

[Math. 9]

$$S_i(p_i, t_i) \geq C (i=1, 2, \ldots, n) \quad (4)$$

C is a constant that satisfies $C \in [0, 1]$. This is a constraint condition not to present an exorbitant amount to each orderer. Without this constraint, if the number of orderers is extremely large for the number of drivers, for example, in the event of terrorism or a disaster, the phenomenon of raising the price will occur. Raising the price in the event of an incident such as terrorism or a disaster can be a major bashing target, so it is necessary to incorporate such a constraint. By setting C=0, this constraint can be removed.

The problem to be solved can be formulated as the following optimization problem.

[Math. 10]

$$\max_{p,t} \sum_{a \in \{0,1\}^n} Pr(a | p, t) f(a, p, t) \quad (5)$$

$$\text{s.t. } S_i(p_i, t_i) \geq C \ (i = 1, 2, \ldots, n)$$

The formulation in the present embodiment is consistent with the formulation in conventional techniques by providing the following settings and constraints. By adopting the acceptance probability model according to each region of conventional techniques as the acceptance probability model, and defining $\alpha$=0, C=0, and the presented required time $t_i$ as the sum of the time required for the driver to travel the distance $a_w$ and the time required to fulfill the order, the problem (5) is consistent with the problem setting of the conventional techniques. Thus, the formulation in the present embodiment has increased the degree of freedom of formulation according to the conventional techniques.

Figure 2:
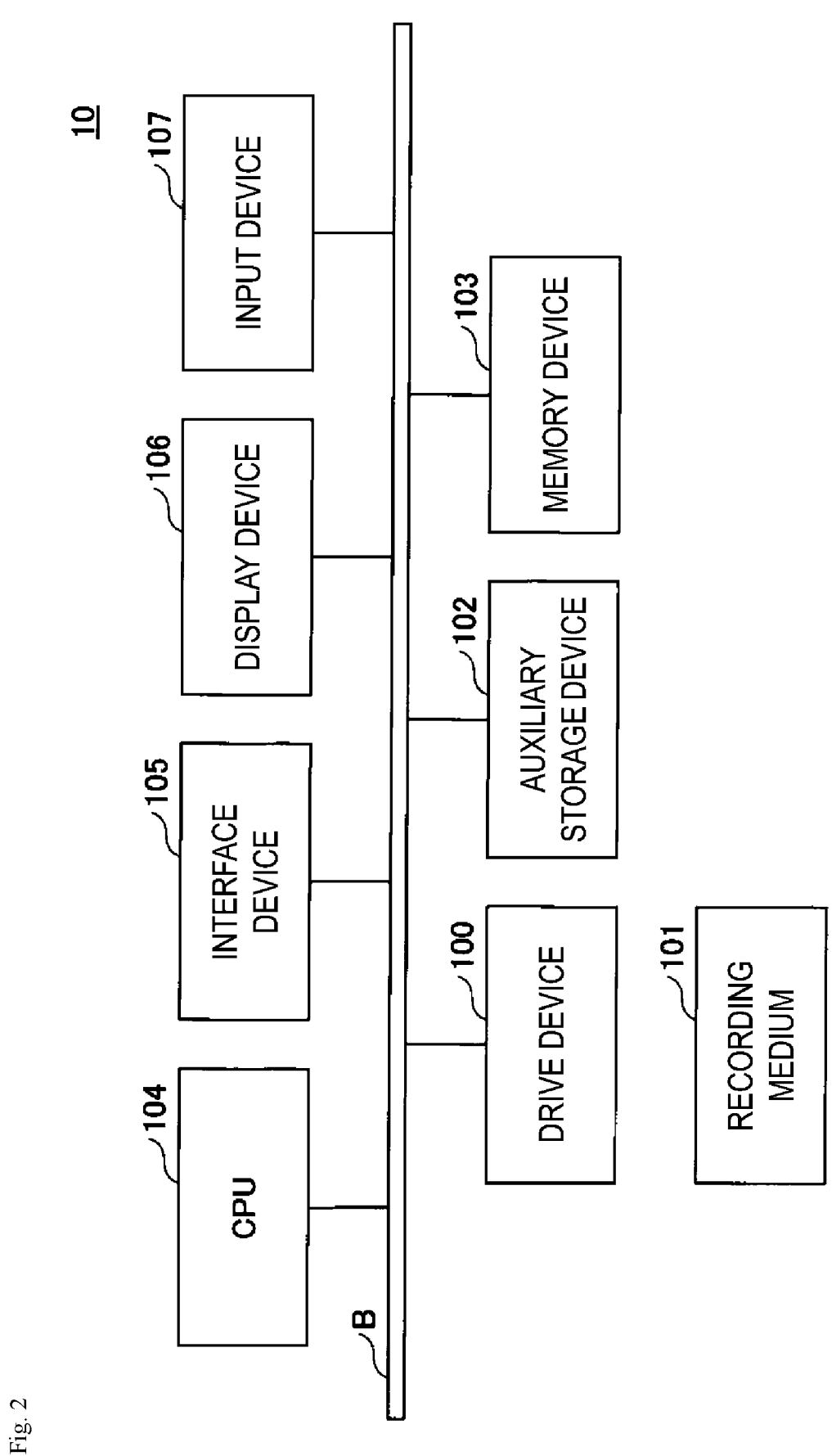
FIG. 2 is a diagram illustrating an example of a hardware configuration of a calculation apparatus 10 according to the embodiment of the present invention.

Hereinafter, an embodiment of the present invention will be described with reference to the drawings. FIG. 2 is a diagram illustrating an example of a hardware configuration of a calculation apparatus 10 according to the embodiment of the present invention. The calculation apparatus 10 of FIG. 2 includes a drive device 100, an auxiliary storage device 102, a memory device 103, a CPU 104, an interface device 105, a display device 106, an input device 107, and the like, which are connected to each other through a bus B.

A program that realizes processing in the calculation apparatus 10 is provided on a recording medium 101 such as a CD-ROM. When the recording medium 101 having the program stored therein is set in the drive device 100, the program is installed in the auxiliary storage device 102 from the recording medium 101 via the drive device 100. However, the program does not necessarily have to be installed from the recording medium 101, and may be downloaded from another computer via a network. The auxiliary storage device 102 stores the installed program and also stores necessary files, data, and the like.

The memory device 103 reads and stores the program from the auxiliary storage device 102 when the program is instructed to start. The CPU 104 realizes a function relevant to the calculation apparatus 10 in accordance with the program stored in the memory device 103. The interface device 105 is used as an interface for connection to a network. The display device 106 displays a graphical user interface (GUI) or the like based on the program. The input device 107 is configured with a keyboard, a mouse, and the like and is used for inputting various operation instructions.

Figure 3:
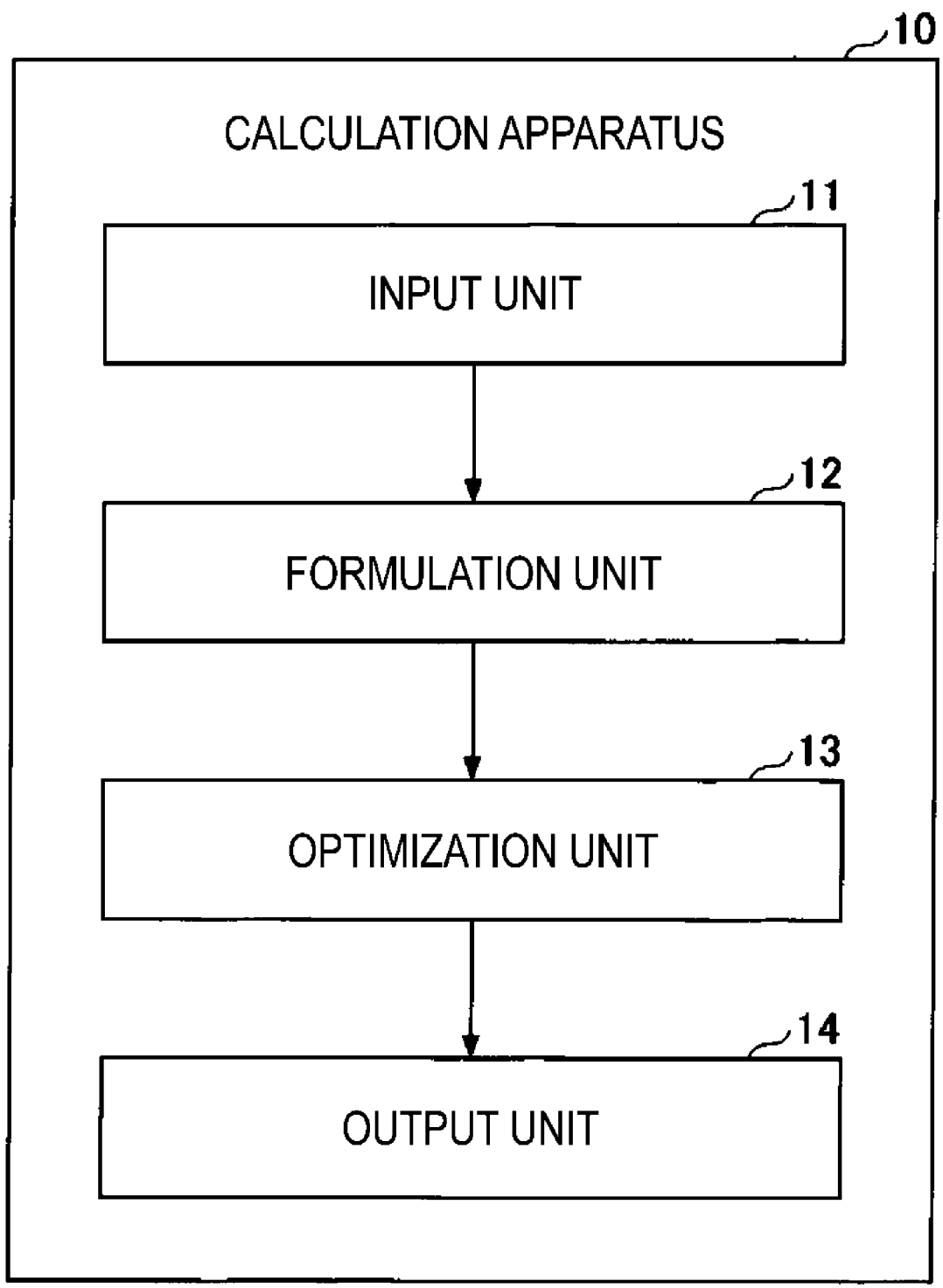
FIG. 3 is a diagram illustrating an example of a functional configuration of the calculation apparatus 10 according to the embodiment of the present invention.

FIG. 3 is a diagram illustrating an example of a functional configuration of the calculation apparatus 10 according to the embodiment of the present invention. In FIG. 3, the calculation apparatus 10 includes an input unit 11, a formulation unit 12, an optimization unit 13, an output unit 14, and the like. One or more programs installed in the calculation apparatus 10 cause the CPU 104 to execute processing, thereby these units are achieved.

Figure 4:
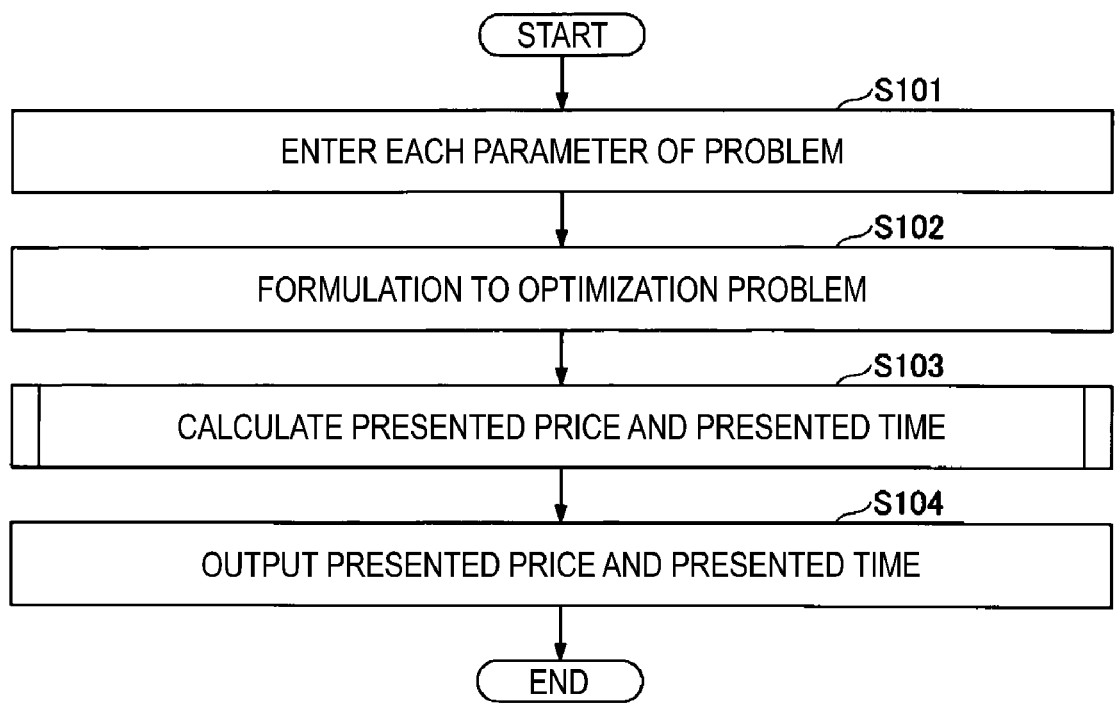
FIG. 4 is a flowchart for illustrating an example of a processing procedure performed by the calculation apparatus 10.

Hereinafter, a processing procedure that is executed by the calculation apparatus 10 will be described. FIG. 4 is a flowchart for describing an example of the processing procedure performed by the calculation apparatus 10.

In step S101, the input unit 11 inputs each parameter of the problem (the distance matrix relating to distances between the taxis and orderers, the travel distance in each order, the opportunity cost parameter of the taxi drivers, and the acceptance probability function for each orderer).

Subsequently, the formulation unit 12 makes a formulation to an optimization problem based on the parameters input by the input unit 11 (substituting the parameters into the optimization problem) (S102). Subsequently, the optimization unit 13 calculates the approximate solutions p and t in the problem (5) based on the parameters of the problem formulated by the formulation unit 12 (S103). Subsequently, the output unit 14 outputs the approximate solutions p and t calculated by the optimization unit 13 (S104).

Subsequently, details of Step S103 will be described.

By solving the optimization problem (5), it is possible to determine the optimal presented price and the required time. Any optimization technique may be used as long as it is possible to derive an approximate solution that achieves the optimal solution of the above-described problem or a good objective function value. For example, the solution may be determined by genetic algorithm, Bayesian optimization, or the like, or an algorithm proposed in the future may be used.

However, the following approximate solution is proposed in the present embodiment because there is no existing conventional technique that can solve the optimization problem described above at high speed.

Approximate Solution

Consider the following problem as an approximation problem of the optimization problem (5).

[Math. 11]

$$\max_{p,t} f\left(\sum_{a \in \{0,1\}^n} Pr(a|p,t)a, p, t\right) \quad (6)$$

$$\text{s.t.} \quad S_i(p_i, t_i) \geq C \ (i = 1, 2, \ldots, n)$$

In the problem (5),

[Math. 12]

$$\sum_{a \in \{0,1\}^n} Pr(a|p,t)$$

is external to the function f, whereas in the above problem, $$\sum_{a \in \{0,1\}^n} Pr(a|p,t) \quad \text{[Math. 13]}$$

is internal to the function f. By performing this operation, it is possible to transform a problem in which a plurality of bipartite graph matching exists into a problem dealing with one typical bipartite graph matching problem.

In this case, assuming that the optimal value in the problem (5) is v and the optimal value in the problem (6) is v', v and v' have the following feature.

[Math. 14]

$$v' \leq v \leq \frac{1}{C}v'$$

Thus, by solving the problem (6), an approximate solution of the problem (5) can be obtained.

Figure 5:
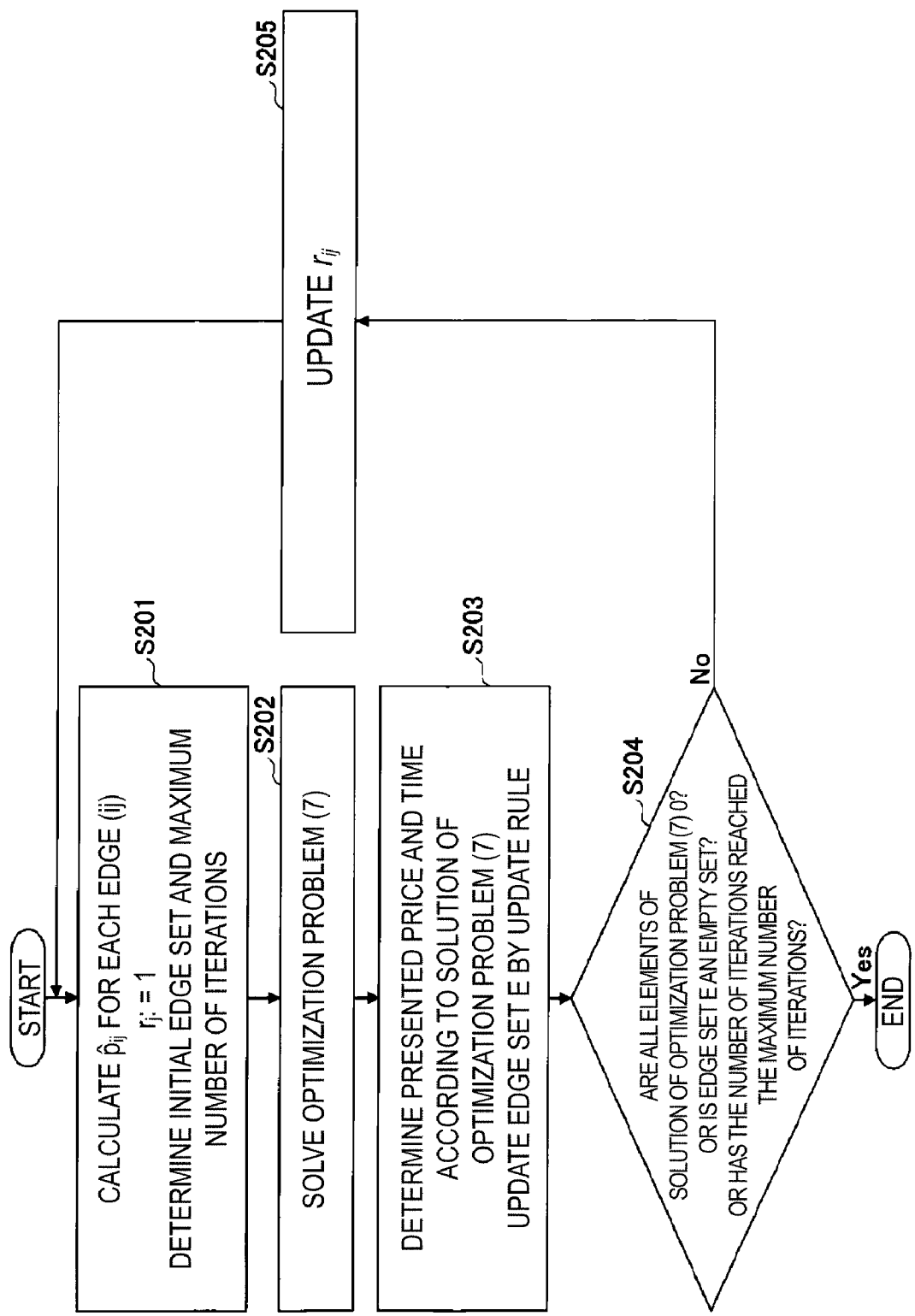
FIG. 5 is a flowchart for illustrating an example of the processing procedure of a calculation process of a presented price and a presented time.

The optimization unit 13 executes an algorithm utilizing this in step S103. FIG. 5 is a flowchart illustrating an example of the processing procedure of the calculation process of the presented price and the presented time.

In step S201, the optimization unit 13 calculates $$\hat{p}_{ij} = \text{argmax}\{(p_{ij} - \alpha(c_{ij} + d_i))S_i(p_{ij}, c_{ij})|S_i(p_{ij}, c_{ij}) \geq C\} \quad \text{[Math. 15]}$$

for each edge (i, j) of the bipartite graph. The optimization unit 13 also defines $r_j := 1$ for each j. The optimization unit 13 also defines $E := \{(i, j) | i=1, 2, \ldots, n, j=1, 2, \ldots, m\}$. The optimization unit 13 further determines the maximum number of iterations. The maximum number of iterations may be input by a user.

Subsequently, the optimization unit 13 solves the following optimization problem (S202).

[Math. 16]

$$\max_z \sum_{(i,j) \in E} (\hat{p}_{ij} - \alpha(c_{ij} + d_i))S_i(\hat{p}_{ij}, c_{ij})r_j z_{ij} \quad (7)$$

$$\text{s.t.} \quad \sum_{j=1}^{m} z_{ij} \leq 1 \quad (i = 1, 2, \ldots, n)$$

$$\sum_{i=1}^{n} z_{ij} \leq 1 \quad (j = 1, 2, \ldots, m)$$

$$z_{ij} \in \{0, 1\} \quad ((i, j) \in E)$$

Subsequently, the optimization unit 13 determines the presented price and the presented time based on the solution to the problem described above. The optimization unit 13 also updates the edge set E with the update rule (S203). Specifically, when the solution to the problem described above is $$\hat{z}, \quad \text{[Math. 17]}$$

the optimization unit 13 defines $$p_i = \{\hat{p}_{ij} | \hat{z}_{ij} = 1\}, t_i = \{c_{ij} | \hat{z}_{ij} = 1\}, \quad \text{[Math. 18]}$$

and updates the edge set E excluding the corresponding branch (i, j) from the edge set E to $$E = E \setminus \{(i,j) | \hat{z}_{ij} = 1\}. \quad \text{[Math. 19]}$$

Subsequently, the optimization unit 13 determines conditions if $$\hat{z}_{ij} = 0, \quad \text{[Math. 20]}$$

for all (i, j), or if E=φ (empty set), or whether or not the number of iterations (number of iterations after step S202) has reached the maximum number of iterations (S204).

If the condition is satisfied (Yes at S204), the optimization unit 13 terminates the process in FIG. 5.

On the other hand, in a case that the condition is not satisfied (No in S204), for $$\text{For each } \{(i,j) | \hat{z}_{ij}=1\}, \qquad \text{[Math. 21]}$$

the optimization unit 13 updates $r_j$ as $$r_j := 1 - S_i(\hat{p}_{ij}, c_{ij}), \qquad \text{[Math. 22]}$$

and returns to step S202.

As described above, according to the present embodiment, by solving the problem of determining the price and the time of the taxi in consideration of the acceptance probability model that represents the acceptance or rejection of the orderer for the price and the required time of the taxi for each orderer as a probability model, it is possible to dispatch a vehicle in consideration of individual differences of each orderer for the price and the required time. As a result, it is possible to dispatch a vehicle according to the characteristics of each individual, and it is possible to improve corporate profits and the overall social welfare of the orderers.

Note that, in the present embodiment, the optimization unit 13 is an example of a calculation unit.

Although the embodiments of the present invention have been described in detail above, the present invention is not limited to such specific embodiments, and various modifications and changes can be made without departing from the gist of the present invention described in the aspects.

REFERENCE SIGNS LIST

- 10 Calculation apparatus
- 11 Input unit
- 12 Formulation unit
- 13 Optimization unit
- 14 Output unit
- 100 Drive device
- 101 Recording medium
- 102 Auxiliary storage device
- 103 Memory device
- 104 CPU
- 105 Interface device
- 106 Display device
- 107 Input device
- B Bus

The invention claimed is:

1. A calculation method comprising, executed by a computer:

interactively receiving a taxi dispatch order from an orderer, wherein the taxi dispatch order comprises a first location data of a first location for boarding a taxi for a trip and a second location data of a second location of a destination of the trip;

receiving input parameters,
wherein the input parameters comprise:
a first distance data between the first location for boarding the taxi and a third location indicating a current location of the taxi,
a second distance data between the first location and the second location,
an opportunity cost parameter of a taxi driver of the taxi, and
an acceptance probability model of the orderer stored in a memory device,
the acceptance probability model of the orderer determines a price data and a needed time data of the trip for the orderer completing the trip using the taxi by maximizing a likelihood of the orderer accepting the price data and the needed time data for the trip,
the acceptance probability model is based at least on a probability of the orderer using a transportation other than taxis and a time value of the orderer, and
the time value is according to a historical record of the orderer accepting a previously determined combination of a previously determined price data and a previously determined needed time data of a previous taxi dispatch order;

determining, by the acceptance probability model of the orderer, using the input parameters as input, the price data and the needed time data of the taxi dispatch order, wherein the needed time includes a first time duration for the taxi to arrive at the first location for boarding and a second time duration for the taxi to move from the first location to the second location;

transmitting the determined price data and the needed time data of the taxi dispatch order over a network to an application configured to output the determined price and the needed time to the orderer;

interactively receiving, through the network, an acceptance of the price and the needed time by the orderer;

updating, based on the interactively received acceptance as an updated historical record of the orderer, a time value of the orderer in the acceptance probability model of the orderer stored in the memory device; and in response to the interactively received acceptance, transmitting a command to dispatch the taxi to the first location for transporting the orderer to the second location according to the taxi dispatch order with the determined price data and the determined needed time data.

2. The calculation method according to claim 1, wherein the determining further comprises solving an optimization problem with a discrete choice model based on a generalized cost function using the input parameters as the acceptance probability model.

3. The calculation method according to claim 1, wherein the determining further comprises determining the price and the needed time by solving the optimization problem using an approximate solution transforming a problem in which a plurality of bipartite graph matching exists into a problem dealing with one bipartite graph matching problem.

4. A calculation apparatus comprising a processor configured to execute a method comprising:

interactively receiving a taxi dispatch order from an orderer, wherein the taxi dispatch order comprises a first location data of a first location for boarding a taxi for a trip and a second location data of a second location of a destination of the trip;

receiving input parameters,
wherein the input parameters comprise:
a first distance data between the first location for boarding the taxi and a third location indicating a current location of the taxi,
a second distance data between the first location and the second location,
an opportunity cost parameter of a taxi driver of the taxi, and
an acceptance probability model of the orderer stored in a memory device,
the acceptance probability model of the orderer determines a price data and a needed time data of the trip for the orderer completing the trip using the taxi by maximizing a likelihood of the orderer accepting the price data and the needed time data for the trip, and the acceptance probability model is based at least on a probability of the orderer using a transportation other than taxis and a time value of the orderer, and the time value is a historical record of the orderer accepting a previously determined combination of a previously determined price data and a previously determined needed time data of a previous taxi dispatch order;

determining, by the acceptance probability model of the orderer, using the input parameters as input, the price data and the needed time data of the taxi dispatch order, wherein the needed time includes a first time duration for the taxi to arrive at the first location for boarding and a second time duration for the taxi to move from the first location to the second location;

transmitting the determined price data and the needed time data of the taxi dispatch order over a network to an application configured to output the determined price data and the needed time data to the orderer;

interactively receiving, through the network, an acceptance of the price and the needed time by the orderer;

updating, based on the interactively received acceptance as an updated historical record of the orderer, the time value of the orderer in the acceptance probability model of the orderer stored in the memory device; and in response to the interactively received acceptance, transmitting a command to dispatch the taxi to the first location according to the taxi dispatch order with the determined price data and the determined needed time data.

5. The calculation apparatus according to claim 4, wherein the generating further comprises solving an optimization problem with a discrete choice model based on a generalized cost function using the input parameters as the acceptance probability model.

6. The calculation apparatus according to claim 4, wherein the generating further comprises determining the price and the needed time by solving the optimization problem using an approximate solution transforming a problem in which a plurality of bipartite graph matching exists into a problem dealing with one bipartite graph matching problem.

7. A computer-readable non-transitory recording medium storing computer-executable program instructions that when executed by a processor cause a computer to execute a method comprising:

interactively receiving a taxi dispatch order from an orderer, wherein the taxi dispatch order comprises a first location data of a first location for boarding a taxi for a trip and a second location data of a second location of a destination of the trip;

receiving input parameters,
wherein the input parameters comprise:
a first distance data between the first location for boarding the taxi and a third location indicating a current location of the taxi,
a second distance data between the first location and the second location,
an opportunity cost parameter of a taxi driver of the taxi, and
an acceptance probability model of the orderer stored in a memory device, the acceptance probability model of the orderer determines a price data and a needed time data of the trip for the orderer completing the trip using the taxi by maximizing a likelihood of the orderer accepting the price data and the needed time data for the trip, and the acceptance probability model is based at least on a probability of the orderer using a transportation other than taxis and a time value of the orderer, and the time value is a historical record of the orderer accepting a previously determined combination of a previously determined price data and a previously determined needed time data of a previous taxi dispatch order;

determining, by the acceptance probability model of the orderer, using the input parameters as input, the price data and the needed time data of the taxi dispatch order, wherein the needed time includes a first time duration for the taxi to arrive at the first location for boarding and a second time duration for the taxi to move from the first location to the second location;

transmitting the determined price data and the needed time data of the taxi dispatch order over a network to an application configured to output the determined price data and the needed time data to the orderer;

interactively receiving, through the network, an acceptance of the price and the needed time by the orderer;

updating, based on the interactively received acceptance as an updated historical record of the orderer, the time value of the orderer in the acceptance probability model of the orderer stored in the memory device; and in response to the interactively received acceptance, transmitting a command to dispatch the taxi to the first location according to the taxi dispatch order with the determined price data and the determined needed time data.

8. The calculation method according to claim 1, the method further comprising:

causing, based on a response from the orderer whether to accept the price data and the needed time data, dispatch of the taxi to the orderer based on the price data and the needed time.

9. The calculation method according to claim 1, wherein the first distance data is within a predetermined distance.

10. The calculation method according to claim 1, wherein the acceptance probability model of the orderer computes a probability rate of acceptance by the orderer of the taxi dispatch order based on the price data and the needed time data according to at least the time value of the orderer, and the time value of the orderer represents a monetary value per unit time of the orderer.

11. The calculation method according to claim 2, wherein the determining comprises includes solving the optimization problem using an approximate solution transforming a problem in which a plurality of bipartite graph matching exists into a problem dealing with one bipartite graph matching problem.

12. The calculation apparatus according to claim 4, the processor further configured to execute a method comprising:

causing, based on a response from the orderer whether to accept the price data and the needed time data, dispatch of the taxi to the orderer based on the price and the needed time.

13. The calculation apparatus according to claim 4, wherein the first distance data is within a predetermined distance.

14. The calculation apparatus according to claim 4, wherein the acceptance probability model of the orderer computes a probability rate of acceptance by the orderer of the taxi dispatch order based on the price data and the needed time data according to at least the time value of the orderer, and the time value of the orderer represents a monetary value per unit time of the orderer.

15. The calculation apparatus according to claim 5, wherein
the generating further comprises solving the optimization problem using an approximate solution transforming a problem in which a plurality of bipartite graph matching exists into a problem dealing with one bipartite graph matching problem.

16. The computer-readable non-transitory recording medium according to claim 7, wherein the determining further comprises solving the optimization problem with a discrete choice model based on a generalized cost function using the input parameters according to the acceptance probability model.

17. The computer-readable non-transitory recording medium according to claim 7, wherein the generating further comprises solving an optimization problem using an approximate solution transforming a problem in which a plurality of bipartite graph matching exists into a problem dealing with one bipartite graph matching problem.

18. The computer-readable non-transitory recording medium according to claim 7, the computer-executable program instructions when executed further causing the computer system to execute a method comprising:
causing, based on a response from the orderer whether to accept the price data and the needed time data, dispatch of the taxi to the orderer based on the price and the needed time data.

19. The computer-readable non-transitory recording medium according to claim 7, wherein the first distance is within a predetermined distance.

20. The computer-readable non-transitory recording medium according to claim 7, wherein the acceptance probability model of the orderer computes a probability rate of acceptance by the orderer of the taxi dispatch order based on the price data and the needed time of the taxi data according to at least the time value of the orderer, and the time value of the orderer represents a monetary value per unit time of the orderer.

* * * * *